United States Patent [19]
Ushio et al.

[11] Patent Number: 5,628,518
[45] Date of Patent: May 13, 1997

[54] METAL GASKET ASSEMBLY

[75] Inventors: Hideaki Ushio; Kazuo Shibata, both of Wako; Masamichi Hoshi, Ohmiya; Naomichi Mitsuyama, Iwatsuki; Akira Tanaka, Ohmiya, all of Japan

[73] Assignees: Honda Giken Koyo Kabushiki Kaisha; Nippon Leakless Industry Co. Ltd., both of Tokyo, Japan

[21] Appl. No.: 711,472

[22] Filed: Sep. 6, 1996

Related U.S. Application Data

[63] Continuation of Ser. No. 399,000, Mar. 6, 1995, abandoned.

[30] Foreign Application Priority Data

Mar. 9, 1994 [JP] Japan .................. 6-038503

[51] Int. Cl.$^6$ ........................... F16J 15/08
[52] U.S. Cl. .................... 277/180; 277/235 B
[58] Field of Search .................... 277/180, 234, 277/235 B

[56] References Cited

U.S. PATENT DOCUMENTS

| | | | |
|---|---|---|---|
| 3,834,141 | 9/1974 | Kuhn | 277/235 B |
| 5,022,661 | 6/1991 | Nakasone | 277/235 B |
| 5,161,809 | 11/1992 | Matsushita et al. | 277/235 B |
| 5,205,566 | 4/1993 | Ueta et al. | 277/235 B |

FOREIGN PATENT DOCUMENTS

| | | | |
|---|---|---|---|
| 544215 | 6/1993 | European Pat. Off. | 277/235 B |
| 574166 | 12/1993 | European Pat. Off. | 277/235 B |
| 606567 | 7/1994 | European Pat. Off. | 277/235 B |
| 627581 | 12/1994 | European Pat. Off. | 277/235 B |
| 633396 | 1/1995 | European Pat. Off. | 277/235 B |
| 165167 | 6/1992 | Japan | 277/235 B |
| 26575 | 2/1994 | Japan | 277/235 B |

*Primary Examiner*—Scott Cummings
*Attorney, Agent, or Firm*—Young & Thompson

[57] ABSTRACT

A metal gasket assembly for a cylinder head includes a pair of elastic metal substrates each having an outer shape which conforms with the outer shape of the gasket assembly, cylinder openings corresponding to cylinders in the cylinder head, a peripheral region surrounding the cylinder opening, which may be greater in thickness than remaining region of the relevant substrate, and a bead in the peripheral region. The substrates are superimposed with each other with top portions of the beads of the substrates in abutment with each other. A by-plate may be arranged between the substrates and has an increased thickness in its peripheral region which surrounds the cylinder opening and which is in direct abutment with the top portions of the beads in the substrates.

7 Claims, 4 Drawing Sheets

FIG_1

FIG_6
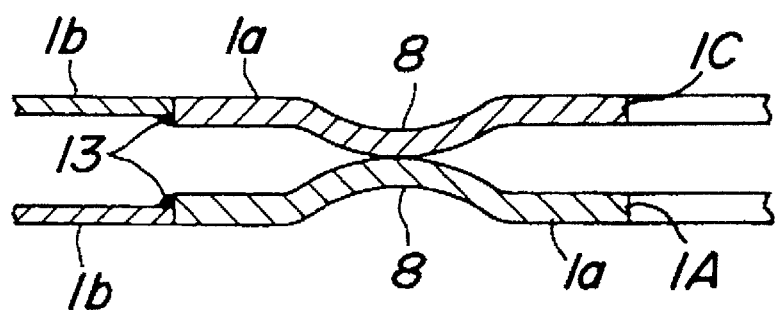
FIG_7
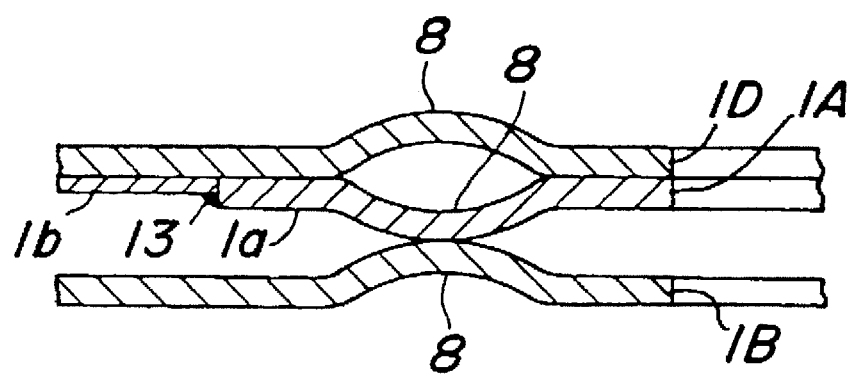

METAL GASKET ASSEMBLY

This application is a continuation of application Ser. No. 08/399,000, filed Mar. 6, 1995, now abandoned.

BACKGROUND OF THE INVENTION

1. Field of the Invention

The present invention relates to a metal gasket assembly for a cylinder head of an internal combustion engine.

2. Description of the Related Art

Metal gasket assembly comprising primarily of metal material is known and disclosed, e.g., in Japanese Patent Application Laid-open Publication No. 4-165,167. Typically, a metal gasket assembly comprises a pair of substrates and a by-plate, each of which is formed of an elastic metal sheet, e.g., a stainless steel sheet. The gasket assembly is formed with various openings, such as openings for engine cylinders, cooling water jackets, lubricating oil passages in the cylinder head, and bolt holes. The substrates are provided with beads in the peripheral regions surrounding the cylinder openings. The substrates are superimposed with the by-plate on its both sides, such that the top portions of the beads on the substrates are oriented in opposite directions to protrude outwards. The by-plate is comprised of a relatively thick first metal sheet which surrounds the cylinder openings with a predetermined width, and a relatively thin second metal sheet which forms the remaining region of the by-plate and which is simply fitted into the first metal sheet, without being welded to each other.

With a recent trend towards internal combustion engines with higher output, there arose a demand for a higher sealing performance of the gasket assembly. Therefore, it has been proposed to increase the thickness of the metal sheet of the by-plate in the peripheral regions which surround the cylinder openings, thereby to realize a higher fastening pressure in the regions adjacent to the engine cylinders.

However, since the top portions of the beads on the substrates protrude outwards in mutually opposite directions, the skirts of the beads may undergo expansion during fastening of the gasket assembly to disperse the fastening pressure and cause dislocation of the skirt of the bead out of the peripheral region of the by-plate which surrounds the cylinder opening. Moreover, since the two metal sheets forming the by-plate are simply fitted to each other, they may undergo a relative displacement upon thermal expansion, so as to form a gap and thereby deteriorate the sealing performance of the gasket assembly.

SUMMARY OF THE INVENTION

It is therefore a primary object of the present invention to provide an improved metal gasket assembly which eliminates to at least mitigates the abovementioned problems.

Briefly stated, the present invention provides a metal gasket assembly for a cylinder head, which includes a pair of elastic metal substrates each having an outer shape which conforms with the outer shape of the gasket assembly. Each substrate has at least one cylinder opening corresponding to at least one cylinder in the cylinder head, a peripheral region surrounding the cylinder opening, and a bead in the peripheral region surrounding the cylinder opening. The substrates are superimposed with each other with top portions of the beads of the substrates directed toward, and in abutment with each other.

In this instance, the peripheral region of the substrate surrounding the cylinder opening may have a thickness which is greater than that of remaining region of the relevant substrate. Alternatively, a by-plate may be arranged between the substrates and designed to have an increased thickness in its peripheral region which surrounds the cylinder opening and which is in direct abutment with the top portions of the beads in the substrates.

With the above-mentioned arrangement of the metal gasket assembly according to the present invention, the substrates are superimposed with each other such that the top portions of the beads in the peripheral region surrounding the cylinder opening are directed toward, and brought into abutment with each other either directly or with the by-plate therebetween. It is thus possible to concentrate the fastening pressure and avoid undesirable dislocation of the skirts of the beads out of predetermined position. Moreover, when the by-plate is held between the substrates, the top portions of the beads are in direct abutment with the by-plate at its peripheral region having an increased thickness. It is thus possible to realize a further increased fastening pressure in such peripheral region.

According to a preferred embodiment of the present invention wherein the metal gasket assembly further comprises a by-plate held between the two substrates, the by-plate comprises a relatively thick first metal sheet having at least one cylinder opening and surrounding the cylinder opening with a predetermined width, and a relatively thin second metal sheet having an outer shape which conforms with the outer shape of the gasket assembly and forming remaining region of the by-plate, in which the first and second metal sheets are fitted and laser-welded to each other. Thus, the two metal sheets of the by-plate can be prevented from dislocation upon thermal expansion, making it readily possible to realize a further improved sealing performance of the gasket assembly.

According to an alternative embodiment of the present invention wherein metal gasket assembly further comprises a by-plate held between the two substrates, the by-plate comprises a first metal sheet having at least one cylinder opening corresponding to said cylinder in the cylinder head and surrounding the cylinder opening with a predetermined width, and a second metal sheet having at least one cylinder opening corresponding to the cylinder in the cylinder head and an outer shape which conforms with the outer shape of the gasket assembly, in which the first and second metal sheets are fitted and laser-welded to each other. In this instance also, the two metal sheets of the by-plate can be prevented from dislocation upon thermal expansion, making it readily possible to realize a further improved sealing performance of the gasket assembly.

According to another preferred embodiment of the present invention, at least one of the substrates comprises a relatively thick first metal sheet having at least one cylinder opening and surrounding the cylinder opening with a predetermined width, and a relatively thin second metal sheet having an outer shape which conforms with the outer shape of the gasket assembly and forming remaining region of the substrate, in which the first and second metal sheets are fitted and laser-welded to each other.

When the metal gasket assembly according to the present invention is for a cylinder block having at least one cooling water jacket, the first and second metal sheets of at least one of the substrates or those of the by-plate are laser-welded to each other at a location which is close to the cooling water jacket in use. This makes it possible to mitigate thermal stress or thermal expansion to which the welded portions are subjected, by the cooling function of the cooling water jacket in the cylinder block.

According to still another embodiment of the present invention, besides first and second substrates, the metal gasket assembly further comprises a third substrate formed of an elastic metal and having an outer shape which conforms with the outer shape of the gasket assembly, at least one cylinder opening corresponding to the cylinder in the cylinder head, a peripheral region surrounding the cylinder opening, and a bead in the peripheral region, wherein the first and third substrates are superimposed with each other with top portions of the beads of the first and third substrates oriented in opposite directions. This makes it possible to realize a further increased elasticity of the beads.

BRIEF DESCRIPTION OF THE DRAWINGS

FIG. 6 is a sectional view similar to FIG. 3, showing the fourth embodiment of the metal gasket assembly according to the present invention; and FIG. 7 is a sectional view similar to FIG. 3, showing the fifth embodiment of the metal gasket assembly according to the present invention.

DESCRIPTION OF THE PREFERRED EMBODIMENTS

Figure 1:
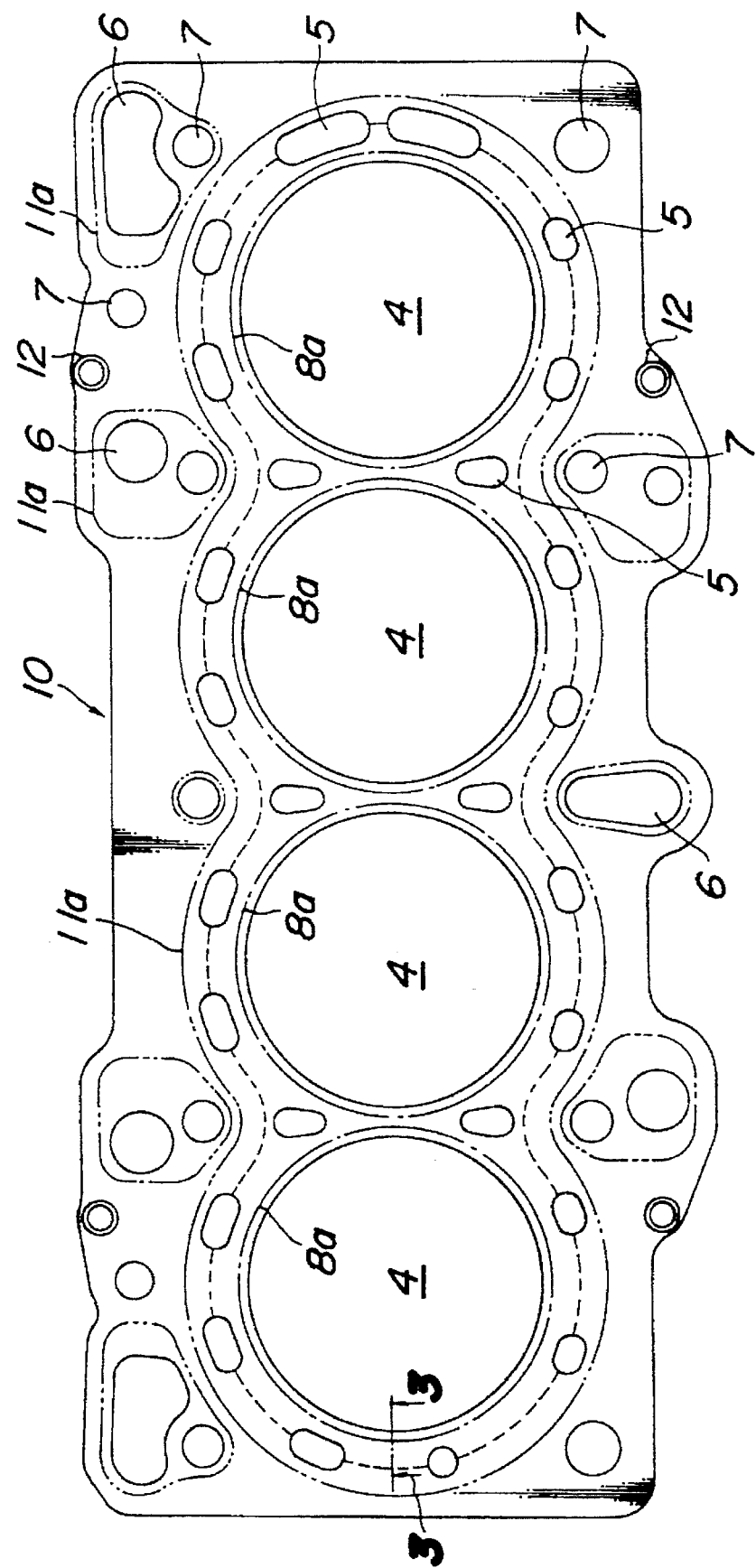
FIG. 1 is a plan view showing a first embodiment of the metal gasket assembly according to the present invention.

The present invention will be explained in further detail hereinafter, with reference to the accompanying drawings wherein like reference numerals are used to denote the same or corresponding elements for the sake of simplicity.

Figure 2:
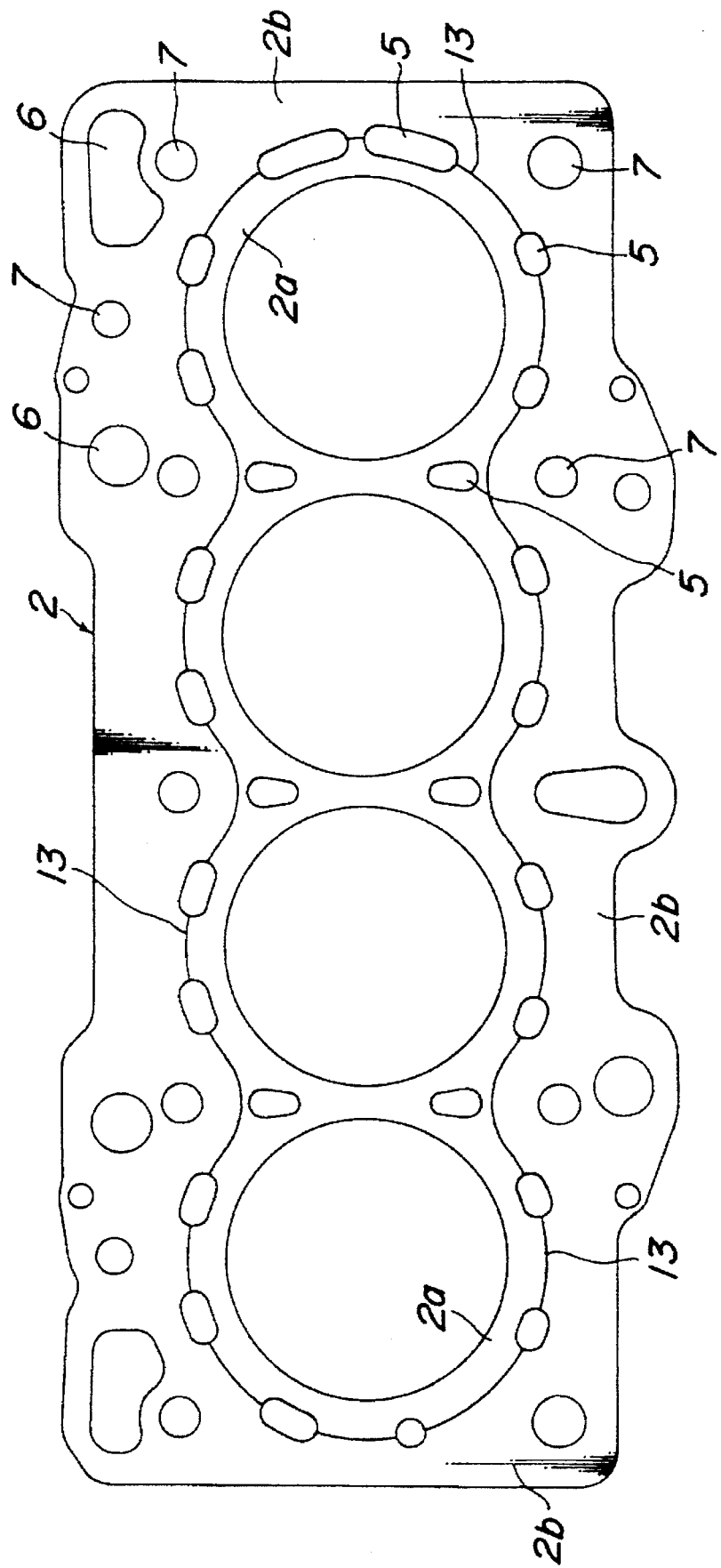
FIG. 2 is a plan view showing the by-plate of the gasket assembly shown in FIG. 1.
Figure 3:
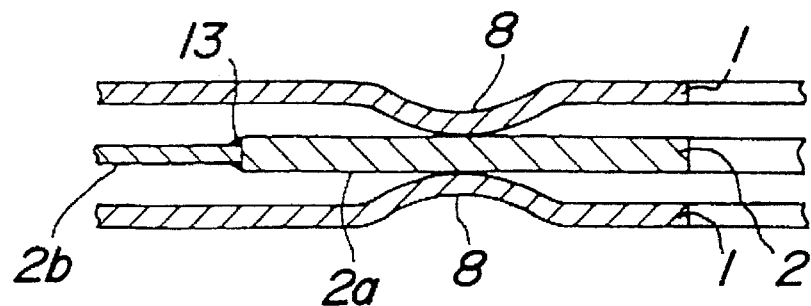
FIG. 3 is a sectional view in enlarged scale, taken along the line 3—3 of FIG. 1.

Referring now to FIGS. 1, 2 and 3, there is shown a first embodiment of the metal gasket assembly 10 according to the present invention, which comprises a pair of substrates 1 and a by-plate 2 held between the substrates 1. The substrates 1 and the by-plate 2 may be each made of elastic metal sheet, such as stainless steel sheet (SUS 301) or the like. The gasket assembly 10 is formed with various openings therein, e.g., cylinder openings 4 for engine cylinders, openings 5 for cooling water jackets, openings 6 for lubricating oil passages, bolt holes 7, etc. Each substrate 1 has full beads 8 of substantially semi-circular cross-section (FIG. 3), which are formed in the peripheral regions surrounding the cylinder openings 4 in the substrate 1. In FIG. 1, the single-dotted chain line 8a represents full bead lines corresponding to the top of the semi-circular shape of the full beads 8, and the double-dotted chain line 11a represents a stepwise half bead line. Reference numeral 12 denotes caulking portions where the metal plates superimposed one above the other are connected with each other.

FIG. 3 is a fragmentary sectional view of the gasket metal assembly 10 in enlarged scale, taken along the line 3—3 of FIG. 1. In this embodiment, the by-plate 2 without the beads is shown as being held between a pair of substrates 1 which are formed with the beads 8 in the peripheral regions of the cylinder openings 4. The by-plate 2 is comprised of a relatively thick metal sheet 2a of a desired outer shape, which circumscribes the peripheral regions of the cylinder openings 4 with a predetermined width, and a relatively thin metal sheet 2b having an outer shape conforming with that of the assembly 10 and forming the remainder of the by-plate 2. The metal sheets 2a, 2b are fitted with and integrally connected to each other by a laser-welding, as shown at 13, and arranged relative to the substrates 1 such that the opposite top portions of the beads 8 in the substrates 1 are brought into abutment with the relatively thick metal plate 2a.

In a practically preferred example of the gasket assembly shown in FIGS. 1 to 3, the substrate 1 has a thickness of 0.25 mm, the metal sheet 2a circumscribing the peripheral regions of the cylinder openings 4 has a thickness of 0.3 mm, and the metal sheet 2b forming the remainder of the by-plate 2 has a thickness of 0.2 mm.

In the first embodiment explained above, the thickness of the metal sheet 2a of the by-plate 2 circumscribing the peripheral regions of the cylinder openings 4 is larger than that of the metal sheet 2b forming the remainder of the by-plate 2, so that the fastening pressure at the relatively thick metal sheet 2a becomes the highest. Moreover, the beads 8 of the substrates 1 are arranged so that the top portions of the beads 8 contact with the metal sheet 2a of the by-plate 2 and the metal sheet 2a is held between the beads 8 of the substrates 1. Therefore, the fastening pressure is concentrated on the top portions of the beads 8 during the fastening, thereby to prevent escapement or dislocation of the skirt of each bead 8. Furthermore, the relatively thick metal sheet 2a and the relatively thin metal sheet 2b are integrally and tightly connected to each other by the laser-welding 13, so that the metal sheets when subjected to a thermal expansion do not undergo a relative dislocation and thus provide an improved sealing performance due the absence of a gap between the metal sheets 2a, 2b.

Figure 4:
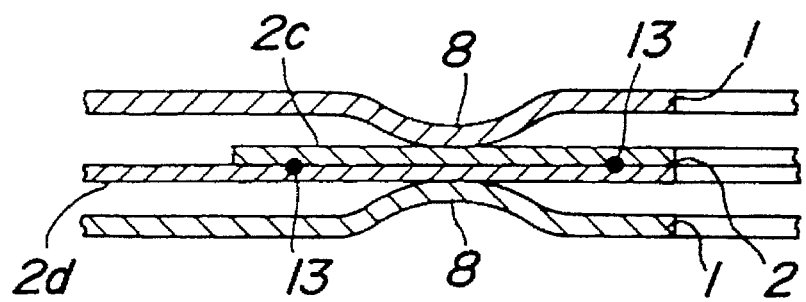
FIG. 4 is a sectional view similar to FIG. 3, showing the second embodiment of the metal gasket assembly according to the present invention.

FIG. 4 shows the second embodiment of the metal gasket assembly according to the present invention. In this case, the gasket assembly includes a pair of substrates 1 which are essentially same as those of the previous embodiment, and a by-plate 2 which is held between the substrates 1. The by-plate 2 is comprised of a first metal sheet 2c of a desired outer shape, which circumscribes the peripheral regions of the cylinder openings 4 with a predetermined width, and a second metal sheet 2d having an outer shape conforming with that of the assembly, which also circumscribes the peripheral regions of the cylinder openings 4. The first and second metal sheets 2c, 2d are superimposed with, and integrally connected to each other by a laser-welding, as shown at 13, and arranged relative to the substrates 1 such that the opposite top portions of the beads 8 in the substrates 1 are brought into abutment with the by-plate 2.

In a practically preferred example of the gasket assembly shown in FIG. 4, the substrate 1 has a thickness of 0.25 mm, the first metal sheet 2c has a thickness of 0.2 mm, and the second metal sheet 2b has a thickness of 0.1–0.15 mm.

In the second embodiment explained above, by superimposing the first and second metal sheets 2a, 2b, the by-plate 2 in the peripheral region of the cylinder openings 4 has a thickness which is larger than that of the remaining region thereof, so that the fastening pressure at the peripheral region becomes the highest. Moreover, the beads 8 of the substrates 1 are arranged so that the top portions of the beads 8 contact with the metal sheet 2a of the by-plate 2 and the metal sheet 2a is held between the beads 8 of the substrates 1. Therefore, the fastening pressure is concentrated on the top portions of the beads 8 during the fastening, thereby to prevent escapement of the skirt of each bead 8. Furthermore, the by-plate 2 is comprised of the first and second metal sheets 2c, 2d which are laser-welded to each other, and thus provides an improved sealing performance due the absence of a gap at the stepped shoulder where the metal sheets 2c, 2d are superimposed with each other.

Figure 5:
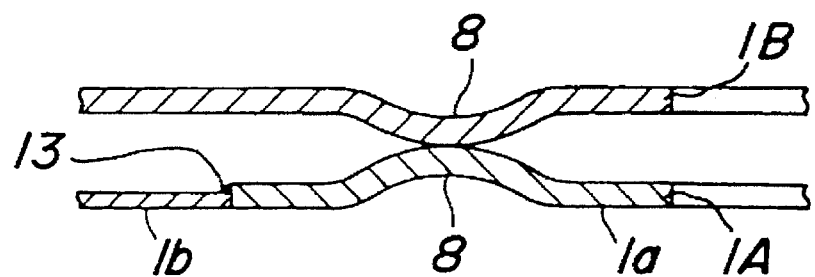
FIG. 5 is a sectional view similar to FIG. 3, showing the third embodiment of the metal gasket assembly according to the present invention.

FIG. 5 shows the third embodiment of the metal gasket assembly according to the present invention. In this case, the gasket assembly includes a pair of substrates 1A, 1B provided with opposite beads 8 and having an outer shape which conforms with that of the gasket assembly. One of the substrates, e.g., the substrate 1A on the lower side, is comprised of a relatively thick metal sheet 1a provided with the bead 8, which forms the peripheral region of the substrate 1A and circumscribes the cylinder openings 4 with a predetermined width, and a relatively thin metal sheet 1b which forms the remaining region of the substrate 1A. The metal sheets 1a, 1b are fitted with and integrally connected to each other by a laser-welding, as shown at 13. The other substrate 1B may be essentially same as the substrate 1 shown in FIG. 3 or 4. The two substrates 1A, 1B are arranged relative to each other such that the opposite top portions of the beads 8 of the substrates 1A, 1B are in direct abutment with each other.

In a practically preferred example of the gasket assembly shown in FIG. 5, the relatively thick metal sheet 1a of the substrate 1A and the substrate 1B have a thickness of 0.25–0.30 mm, and the relatively thin metal sheet 1b of the substrate 1A has a thickness of 0.15–0.2 mm.

In the third embodiment explained above, the thickness of the elastic metal sheet 1a for the peripheral region of the substrate 1A is larger than that of the metal sheet 1b for the remaining region of the substrate 1A, so that the fastening pressure at the peripheral region becomes the highest. Moreover, the beads 8 of the substrates 1A, 1B are arranged so that the top portions of the beads 8 with each other. Therefore, the fastening pressure is concentrated on the top portions of the beads 8 during the fastening, thereby to prevent escapement of the skirt of each bead 8. Furthermore, the substrate 1A is comprised of the two metal sheets 1a, 1b which are laser-welded to each other, so that the metal sheets when subjected to a thermal expansion do not undergo a relative dislocation and thus provide an improved sealing performance due the absence of a gap between the metal sheets 1a, 1b.

FIG. 6 shows the fourth embodiment of the metal gasket assembly according to the present invention. In this case, the gasket assembly includes a pair of substrates 1A, 1C which are essentially same as the substrate 1A of the third embodiment. Thus, each substrate 1A, 1C is provided with the bead 8 and has an outer shape which conforms with that of the gasket assembly. Further, each substrate 1A, 1C is comprised of a relatively thick metal sheet 1a provided with the bead 8, which forms the peripheral region of the substrate and circumscribes the cylinder openings 4 with a predetermined width, and a relatively thin metal sheet 1b which forms the remaining region of the substrate 1A. The metal sheets 1a, 1b are fitted with and integrally connected to each other by a laser-welding, as shown at 13. The two substrates 1A, 1C are arranged relative to each other such that the top portions of the beads 8 of the substrates 1A, 1B are opposite to, and in direct abutment with each other.

In a practically preferred example of the gasket assembly shown in FIG. 6, the relatively thick metal sheets 1a of the substrates 1A, 1C have a thickness of 0.25–0.30 mm, and the relatively thin metal sheets 1b of the substrates 1A, 1C have a thickness of 0.15–0.2 mm.

In the fourth embodiment explained above, the substrate 1B of a constant thickness in the third embodiment is substituted by the substrate 1C which includes a relatively thick metal sheet 1a in the peripheral region which circumscribes the cylinder openings 4. Since the metal sheet 1a in the peripheral region has a thickness which is larger than that of the metal sheet 1b for the remaining regions of the substrates 1A, 1C, the fastening pressure at the peripheral regions becomes the highest. Moreover, the beads 8 of the substrates 1A, 1C are arranged so that the top portions of the beads 8 with each other. Therefore, the fastening pressure is concentrated on the top portions of the beads 8 during the fastening, thereby to prevent escapement of the skirt of each bead 8. Furthermore, each substrate 1A, 1C is comprised of the two metal sheets 1a, 1b which are laser-welded to each other, so that the metal sheets when subjected to a thermal expansion do not undergo a relative dislocation and thus provide an improved sealing performance due the absence of a gap between the metal sheets 1a, 1b.

FIG. 7 shows the fifth embodiment of the metal gasket assembly according to the present invention. In this case, the gasket assembly includes three substrates 1A, 1B and 1D each having an outer shape which conforms with that of the gasket assembly and provided with a bead 8 in the peripheral region which circumscribes the cylinder opening 4. The arrangement of the first and second substrates 1A, 1B is essentially same as that of the third embodiment shown in FIG. 5. Thus, the first substrate 1A is comprised of a relatively thick metal sheet 1a provided with the bead 8, which forms the peripheral region of the substrate 1A and circumscribes the cylinder openings 4 with a predetermined width, and a relatively thin metal sheet 1b which forms the remaining region of the substrate 1A. The metal sheets 1a, 1b are fitted with and integrally connected to each other by a laser welding, as shown at 13. The second substrate 1B may be essentially same as the substrate 1 shown in FIG. 3 or 4. The first and second substrates 1A, 1B are arranged relative to each other such that the opposite top portions of the beads 8 of the substrates 1A, 1B are in direct abutment with each other. Furthermore, the third substrate 1D is arranged on the outer side of the first substrate 1A, and may also be essentially same as the substrate 1 shown in FIG. 3 or 4. However, the first and third substrates 1A, 1D are arranged relative to each other such that the opposite top portions of the beads 8 of the substrates 1A, 1D are oriented in opposite directions, leaving a space therebetween.

In a practically preferred example of the gasket assembly shown in FIG. 7, the relatively thick metal sheet 1a of the substrate 1A and the substrates 1B, 1D have a thickness of 0.25 mm, and the relatively thin metal sheet 1b of the substrate 1A has a thickness of 0.15 mm.

The fifth embodiment explained above achieves all of the advantageous functions of the the gasket assembly according of the third embodiment. Moreover, since the gasket assembly of the third embodiment comprising the first and second substrates 1A, 1B is further combined with the third substrate 1D, it is possible to provide further improved elasticity in the peripheral region of the assembly circumscribing the cylinder openings 4 and hence further improved sealing performance.

In the first to fifth embodiments explained above, the laser-welded portions 13 are preferably arranged at locations close to the cooling-water openings 5 shown in FIGS. 1 and 2, which correspond the water-jackets in the cylinder block. In this instance, it is possible to mitigate the thermal stress imposed on the welded portions 13 and the thermal expansion of the welded portions 13, by the cooling function of the water jackets in the cylinder block.

While the present invention has been described with reference to a specific embodiment, it is of course that various modifications and/or alterations are possible without departing from the scope of the invention as defined by the appended claims.

We claim:

1. A metal gasket assembly for a cylinder head with at least one cylinder, comprising a first and a second substrate, each substrate being formed of an elastic metal and having an outer shape which conforms with the outer shape of the gasket assembly, each substrate having at least one cylinder opening corresponding to said cylinder in the cylinder head, each substrate having a peripheral region surrounding said cylinder opening, and a bead in said peripheral region of each said substrate, all of the bead of at least one said substrate being greater in thickness than the remainder of the same substrate, said first and second substrates being superimposed with each other with top portions of the beads of the first and second substrates extending toward each other.

2. A metal gasket assembly comprising a by-plate held between first and second substrates, said by-plate comprising a first metal sheet having at least one cylinder opening corresponding to a cylinder in a cylinder head and surrounding said cylinder opening with a predetermined width, and a second metal sheet having at least one cylinder opening corresponding to said cylinder in a cylinder head and an outer shape which conforms with the outer shape of the gasket assembly, said first and second metal sheets only partially overlapping and being secured to each other, said first and second substrates having beads that extend toward each other, the bead of the first substrate contacting the first sheet of the by-plate and the bead of the second substrate contacting the second sheet of the by-plate, the overlap of said first and second sheets beginning at said cylinder opening.

3. A metal gasket assembly according to claim 2, wherein said first and second metal sheets of the by-plate are laser welded to each other.

4. A metal gasket assembly for a cylinder head with at least one cylinder, comprising a first and a second substrate, each substrate being formed of an elastic metal, each substrate having at least one cylinder opening corresponding to said cylinder in the cylinder head, each substrate having a peripheral region surrounding said cylinder opening, and a bead in said peripheral region of each said substrate, said first and second substrates being superimposed with each other with top portions of the beads of the first and second substrates extending toward each other, at least one said substrate comprising a relatively thick first metal sheet in which said at least one cylinder opening is formed and a relatively thin second metal sheet forming the remaining portion of the first substrate, said first and second metal sheets of the first substrate being secured to each other in edgewise abutting relation.

5. A metal gasket assembly according to claim 4, wherein said first and second metal sheets of the first substrate are laser welded to each other.

6. A metal gasket assembly according to claim 4, wherein said first metal sheet of the first substrate includes said bead of said first metal sheet.

7. A metal gasket assembly according to claim 4, further comprising a third substrate formed of an elastic metal and having at least one cylinder opening corresponding to said cylinder in the cylinder head, a peripheral region surrounding said cylinder opening, and a bead in said peripheral region, said first and third substrates being superimposed with each other with said beads of the first and third substrates extending in opposite directions from each other.

* * * * *